US008596051B2

(12) United States Patent
Malaney et al.

(10) Patent No.: US 8,596,051 B2

(45) Date of Patent: Dec. 3, 2013

(54) CONTROL VALVE ACTUATION

(75) Inventors: David Malaney, West Bloomfield, MI (US); Glenn Clark Fortune, Farmington Hills, MI (US); Dennis E. Szulczewski, Chaska, MN (US); Michel A. Beyer, Carver, MN (US); Thomas Joseph Stoltz, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 1003 days.

(21) Appl. No.: 12/580,997

(22) Filed: Oct. 16, 2009

(65) Prior Publication Data

US 2010/0132798 A1 Jun. 3, 2010

Related U.S. Application Data

(60) Provisional application No. 61/106,197, filed on Oct. 17, 2008.

(51) Int. Cl.
*F16D 31/02* (2006.01)

(52) U.S. Cl.
USPC .................................. 60/327; 60/420; 60/469

(58) Field of Classification Search
USPC ............... 60/431, 420, 368, 469, 327; 417/38
See application file for complete search history.

(56) References Cited

U.S. PATENT DOCUMENTS

| | | | | |
|---|---|---|---|---|
| 3,253,170 | A | 5/1966 | Phillips et al. | |
| 3,844,696 | A | 10/1974 | Stiles et al. | |
| 5,489,831 | A | 2/1996 | Harris | |
| 5,551,770 | A * | 9/1996 | Hrovat et al. | 303/167 |
| 6,234,758 | B1 | 5/2001 | Pawelski | |
| 6,695,693 | B2 * | 2/2004 | Ho et al. | 460/6 |
| 7,832,523 | B2 * | 11/2010 | Hung et al. | 180/421 |
| 8,226,370 | B2 | 7/2012 | Wu et al. | |
| 2006/0275135 | A1 | 12/2006 | Nation et al. | |
| 2007/0071609 | A1 * | 3/2007 | Gardner | 417/38 |
| 2007/0199440 | A1 | 8/2007 | Brockman et al. | |
| 2008/0184875 | A1 | 8/2008 | Nielsen | |
| 2009/0123313 | A1 | 5/2009 | Armstrong et al. | |

FOREIGN PATENT DOCUMENTS

| | | |
|---|---|---|
| DE | 199 18 455 A1 | 11/2000 |
| DE | 10 2005 004 208 A1 | 6/2006 |
| WO | WO 99/27197 | 6/1999 |

OTHER PUBLICATIONS

International Search Report and Written Opinion mailed Feb. 15, 2010.

* cited by examiner

*Primary Examiner* — Edward Look
*Assistant Examiner* — Logan Kraft
(74) *Attorney, Agent, or Firm* — Merchant & Gould P.C.

(57) ABSTRACT

A hydraulic system includes a power source, a fluid displacement assembly, a plurality of actuators, a plurality of control valves and an electronic control unit. The fluid displacement assembly is coupled to the power source. The plurality of actuators is in selective fluid communication with the fluid displacement assembly. The plurality of control valves is adapted to provide selective fluid communication between the fluid displacement assembly and the plurality of actuators. The electronic control unit is adapted to actuate the plurality of control valves, the electronic control unit receives a rotational speed of the power source, determines a firing frequency of the power source based on the rotational speed, selects a frequency of the pulse width modulation signal for the plurality of control valves based on the firing frequency of the power source, and actuates the plurality of control valves in accordance with the frequency of the pulse width modulation signal.

22 Claims, 11 Drawing Sheets

CONTROL VALVE ACTUATION

CROSS-REFERENCE TO RELATED APPLICATIONS

The present application claims priority to U.S. Provisional Patent Application Ser. No. 61/106,197 entitled "Hydraulic Digital Valve Sequencing of Operation by Matching to Engine Firing Frequencies to Mask Fluid Flow Pulsation Noises" and filed on Oct. 17, 2008. The above identified disclosure is hereby incorporated by reference in its entirety.

BACKGROUND

Hydraulic systems are utilized on various on and off-highway commercial vehicles such as wheel loaders, skid-steer loaders, excavators, etc. These hydraulic systems typically utilize a pump to provide fluid to a desired location such as an actuator. The actuators can be used for various applications on the vehicles. For example, the actuators can be used to propel the vehicles, to raise and lower booms, etc.

The hydraulic systems may also utilize various valves for controlling the distribution of fluid to the various actuators. For example, the hydraulic system may include fluid regulators, pressure relief valves, directional control valves, etc.

SUMMARY

An aspect of the present disclosure relates to a method for actuating a control valve of a hydraulic system. The method includes receiving an input from a variable speed component. A frequency of the variable speed component is determined based on the input. A frequency of a pulse width modulation signal for a control valve of a hydraulic system is selected. The selected frequency of the pulse width modulation signal is based on the frequency of the variable speed component. The control valve is actuated in accordance with the selected frequency of the pulse width modulation signal.

Another aspect of the present disclosure relates to a method for actuating a control valve of a hydraulic system. The method includes receiving a first input from a variable speed component. A second input from the variable speed component is received. The second input is compared to a predetermined limit. Frequency tracking is enabled if the second input is within the bounds of the predetermined limit. Frequency tracking includes determining a frequency of the variable speed component based on the first input, selecting a control valve actuation frequency for a control valve of a hydraulic system based on the frequency of the variable speed component, and actuating the control valve in accordance with the control valve actuation frequency.

Another aspect of the present disclosure relates to a hydraulic system. The hydraulic system includes a power source. A fluid displacement assembly is coupled to the power source. A plurality of actuators is in selective fluid communication with the fluid displacement assembly. A plurality of control valves is adapted to provide selective fluid communication between the fluid displacement assembly and the plurality of actuators. An electronic control unit is adapted to actuate the plurality of control valves, the electronic control unit receives a rotational speed of the power source, determines a firing frequency of the power source based on the rotational speed, selects a frequency of a pulse width modulation signal for the plurality of control valves based on the firing frequency of the power source, and actuates the plurality of control valves in accordance with the frequency of the pulse width modulation signal.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
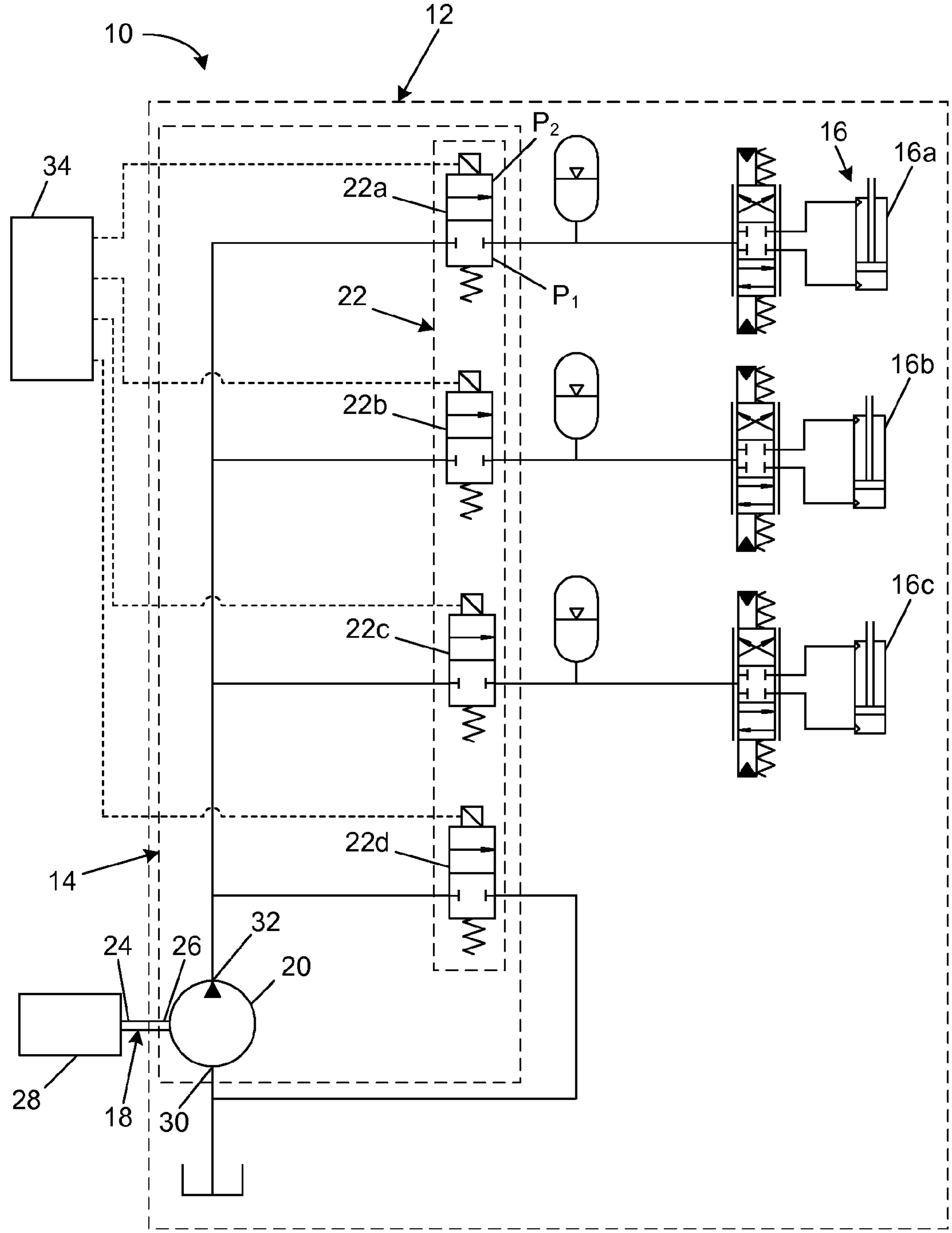
FIG. 1 is a schematic representation of a hydraulic system having exemplary features of aspects in accordance with the principles of the present disclosure.
Figure 2:
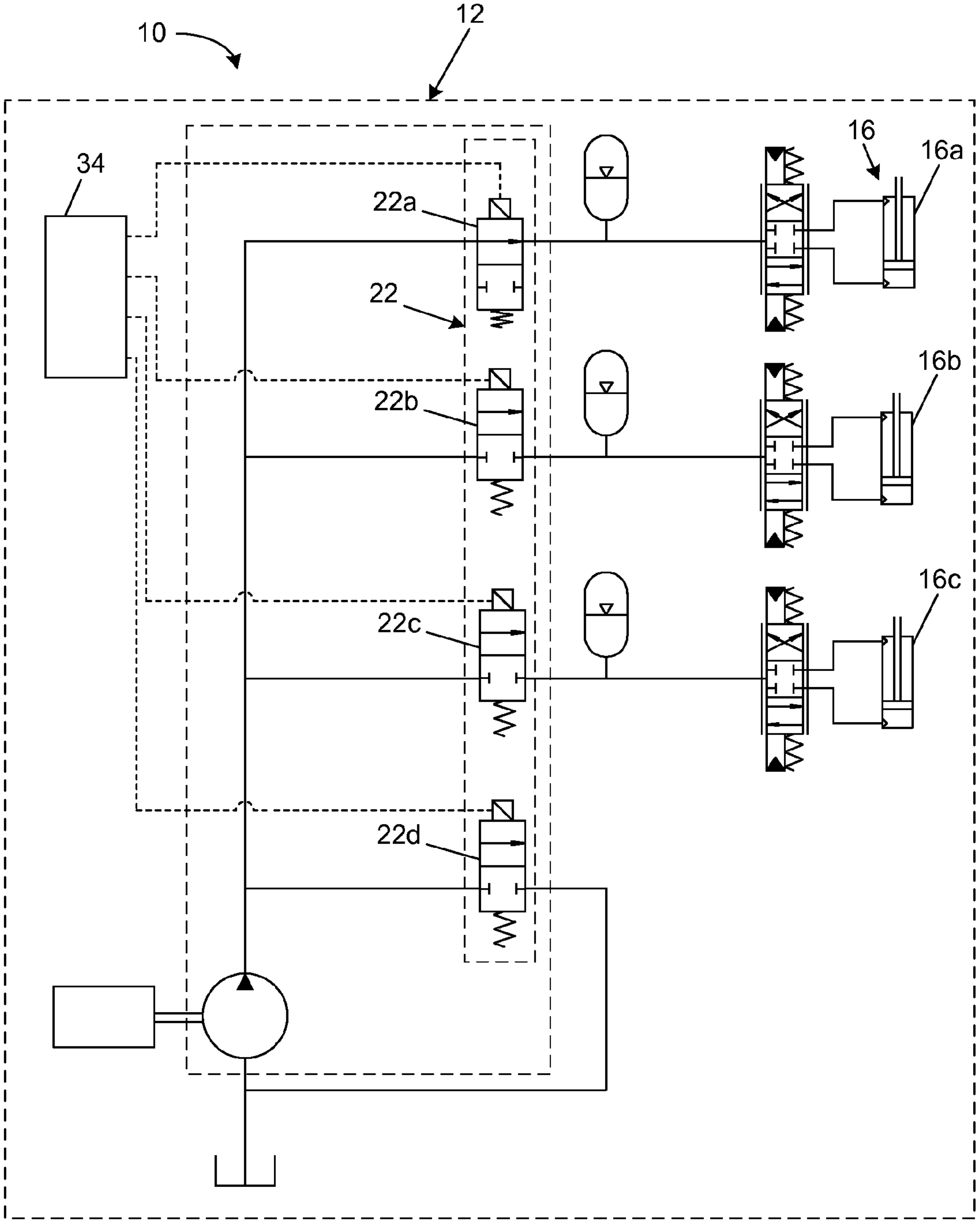
FIG. 2 is a schematic representation of the hydraulic system with a first control valve in a second position.
Figure 3:
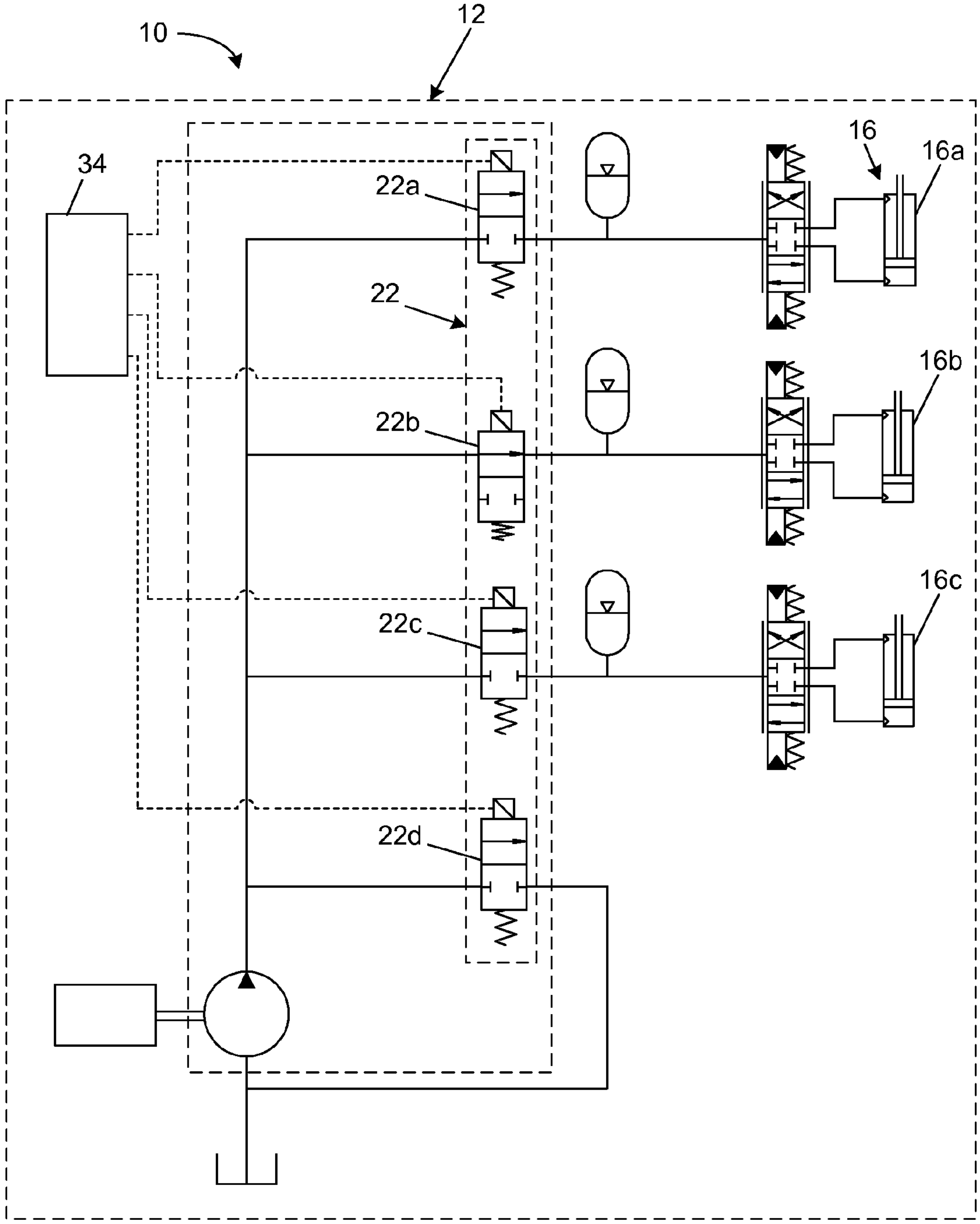
FIG. 3 is a schematic representation of the hydraulic system with a second control valve in a second position.
Figure 4:
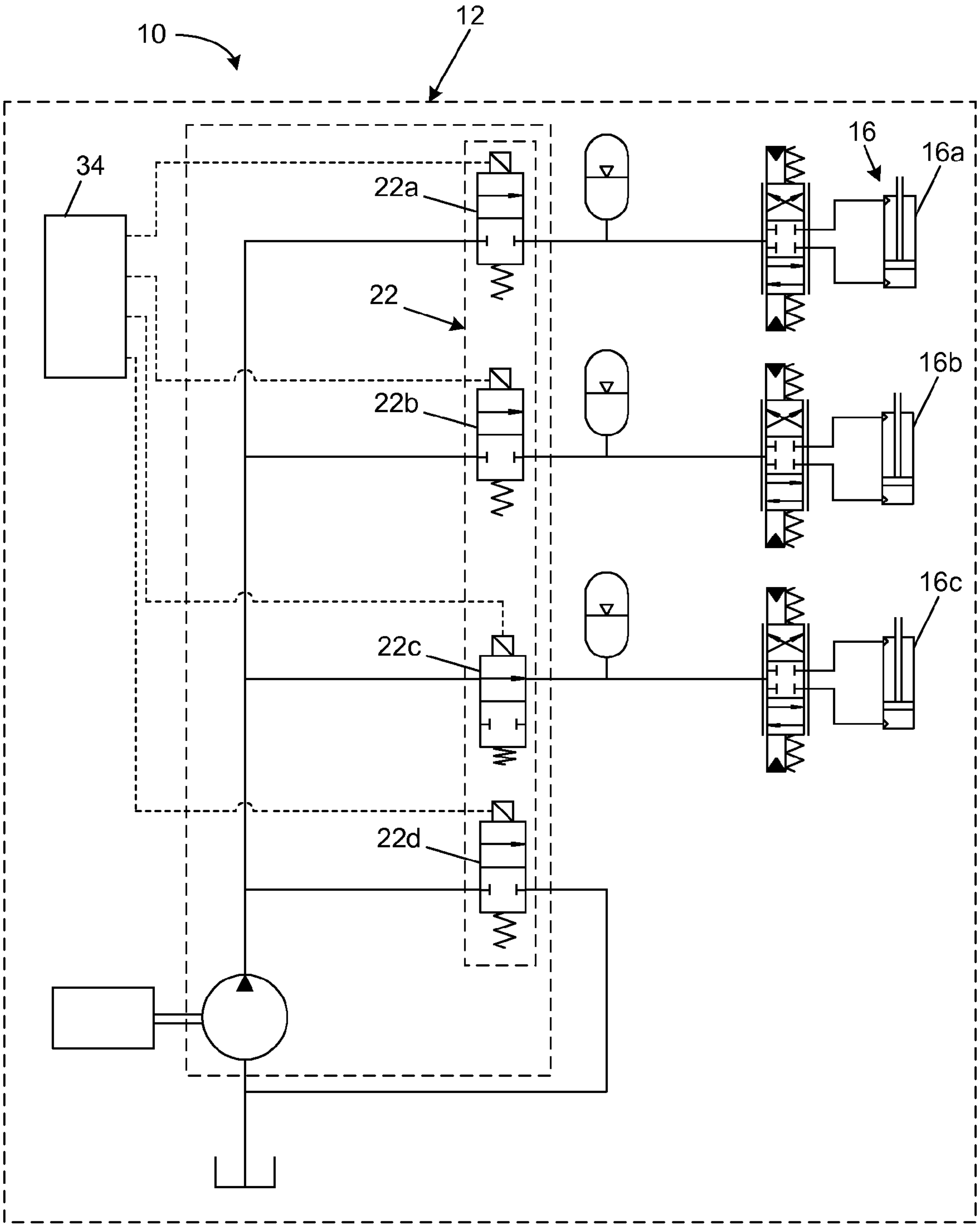
FIG. 4 is a schematic representation of the hydraulic system with a third control valve in a second position.
Figure 5:
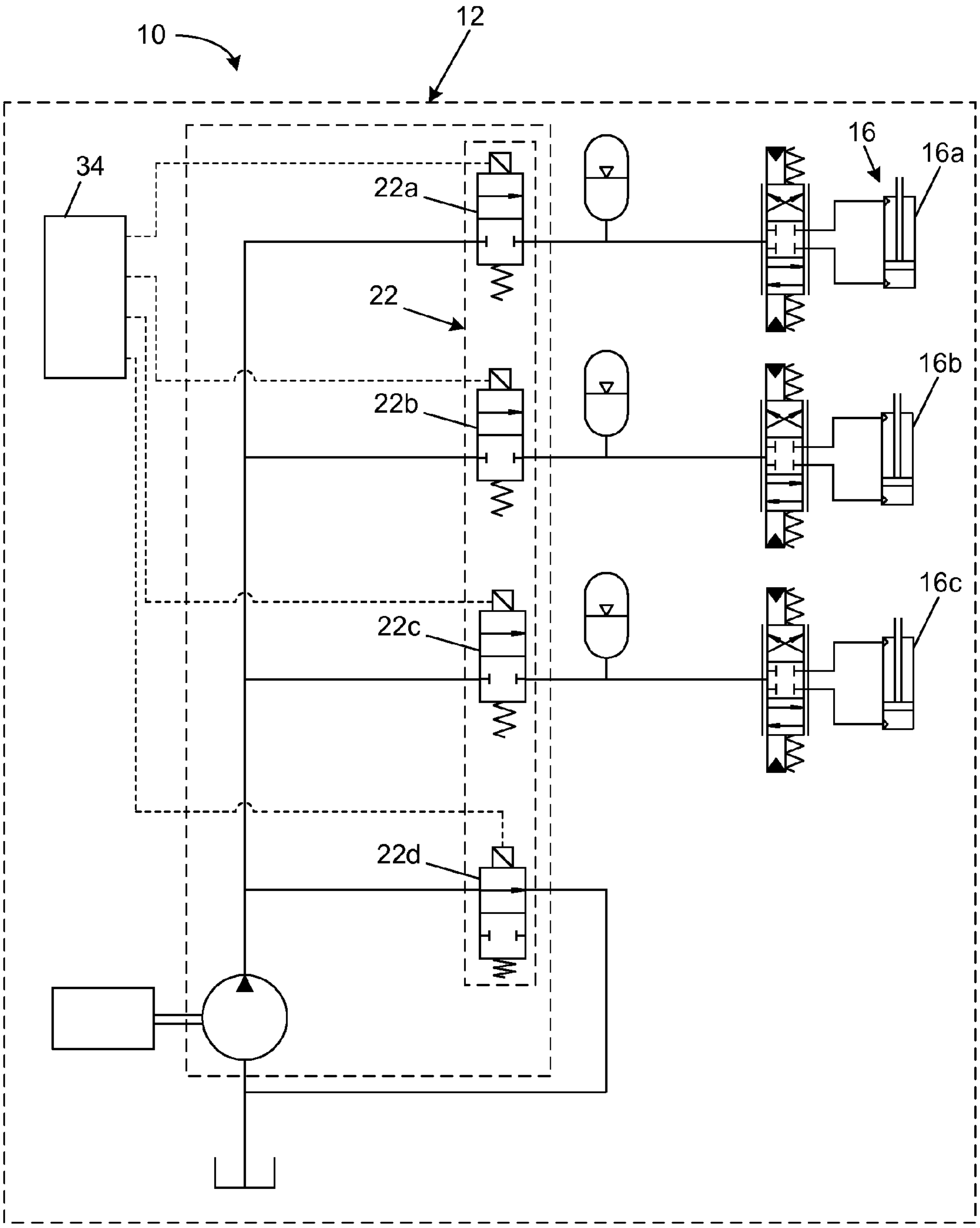
FIG. 5 is a schematic representation of the hydraulic system with a fourth control valve in a second position.

Referring now to FIG. 1, a schematic representation of a hydraulic system, generally designated 10, is shown. In one aspect of the present disclosure, the hydraulic system 10 is disposed on a vehicle 12, such as an off-highway vehicle used for construction and/or agriculture (e.g., wheel loaders, skid-steer loaders, excavators, etc.).

The hydraulic system 10 includes a pump assembly 14 and an actuator 16. The pump assembly 14 includes a shaft 18, a fluid displacement assembly 20 and a plurality of control valves 22.

The shaft 18 of the pump assembly 14 includes a first end 24 and an oppositely disposed second end 26. The first end 24 is coupled to a power source 28. In one aspect of the present disclosure, the power source 28 is an engine of the vehicle 12. The second end 26 of the shaft 18 is coupled to the fluid displacement assembly 20 so that rotation of the shaft 18 by the power source 28 causes rotation of the fluid displacement assembly 20.

The fluid displacement assembly 20 of the pump assembly 14 has a fluid inlet 30 and a fluid outlet 32. In one aspect of the present disclosure, the fluid displacement assembly 20 is a fixed displacement assembly. As such, the amount of fluid that flows through the fluid inlet 30 and fluid outlet 32 of the fluid displacement assembly 20 in one complete rotation of the shaft 18 is generally constant. In the present disclosure, the term "generally constant" accounts for deviations in the amount of fluid that flows through the fluid displacement assembly 20 in one complete rotation of the shaft 18 due to flow ripple effects caused by pumping elements (e.g., pistons, vanes, gerotor star teeth, gears, etc.) of the fluid displacement assembly 20. As a fixed displacement assembly, the fluid displacement assembly 20 can not be directly adjusted to increase or decrease the amount of fluid that flows through the fluid displacement assembly 20 during one complete rotation of the shaft 18.

The plurality of control valves 22 is adapted to effectively increase or decrease the amount of fluid that flows to the actuators 16. In one aspect of the present disclosure, each of the plurality of control valves 22 of the pump assembly 14 is a two-way, two-position type valve. As a two-way, two-position type valve, each of the plurality of control valves 22 has a first position $P_1$ and a second position $P_2$. In the first position $P_1$, the control valve 22 blocks fluid flow through the control valve 22. In the second position $P_2$, the control valve 22 allows fluid to flow through the control valve 22. Each of the plurality of control valves 22 is repeatedly cycled between the first and second position $P_1$, $P_2$ using pulse width modulation. The rate at which fluid flows through each of the plurality of control valves 22 is dependent on the amount of time each of the plurality of control valves 22 is in the second position $P_2$. In other words, the rate at which fluid flows through each of the plurality of control valves 22 is dependent on the duty cycle of the pulse width modulation signal for the plurality of control valves 22, where the duty cycle is equal to the amount of time the control valve 22 is in the second position $P_2$ over the period of the pulse width modulation signal.

In one aspect of the present disclosure, the control valves 22 are fast-acting digital control valves 22. Digital control valves suitable for use in the hydraulic system 10 have been described in U.S. patent application Ser. No. 12/422,893, now U.S. Pat. No. 8,226,370, issued Jul. 24, 2012, which is hereby incorporated by reference in its entirety. As fast-acting digital control valves 22, the control valves 22 can be actuated between the first and second positions $P_1$, $P_2$ quickly. In one aspect of the present disclosure, the control valves 22 can be actuated between the first and second positions in less than or equal to about 1 ms. The control valves 22 can be actuated in response to an electronic signal from an electronic control unit (ECU) 34, a hydraulic pilot signal, or a combination thereof.

In depicted embodiment of FIG. 1, the plurality of control valves 22 includes a first control valve 22*a*, a second control valve 22*b*, a third control valve 22*c* and a fourth control valve 22*d*. The first control valve 22*a* is adapted to provide selective fluid communication between the fluid outlet 32 of the fluid displacement assembly 20 and a first actuator 16*a*. The second control valve 22*b* is adapted to provide selective fluid communication between the fluid outlet 32 of the fluid displacement assembly 20 and a second actuator 16*b*. The third control valve 22*c* is adapted to provide selective fluid communication between the fluid outlet 32 of the fluid displacement assembly 20 and a third actuator 16*c* while the fourth control valve 22*d* is adapted to provide selective fluid communication between the fluid outlet 32 of the fluid displacement assembly 20 and the fluid inlet 30 of the fluid displacement assembly 20. In one aspect of the present disclosure, the first, second and third actuators 16*a*, 16*b*, 16*c* are linear actuators, rotary actuators, or combinations thereof.

An exemplary operation of the hydraulic system 10 will be described. The power source 28 rotates the shaft 18 of the pump assembly 14. As the fluid displacement assembly 14 has a fixed displacement, the amount of fluid being passed through the fluid displacement assembly 20 during one complete revolution of the shaft 18 is generally constant. However, in the present example, the first, second and third actuators 16*a*, 16*b*, 16*c* each require fluid at different flow rates and different pressures.

Referring now to FIGS. 2-5, an actuation cycle of the control valves 22 is shown. To accommodate the flow requirements of the actuators 16, the control valves 22 are independently actuated between the first and second positions $P_1$, $P_2$. In the present example, the control valves 22 are sequentially actuated. The first control valve 22*a* is actuated to the second position $P_2$ so that fluid is communicated from the fluid outlet 32 of the fluid displacement assembly 20 to the first actuator 16*a* (shown in FIG. 2). As the first control valve 22*a* returns to the first position $P_1$, the second control valve 22*b* is actuated to the second position $P_2$ so that fluid is communicated from the fluid outlet 32 of the fluid displacement assembly 20 to the second actuator 16*b* (shown in FIG. 3). As the second control valve 22*b* returns to the first position $P_1$, the third control valve 22*c* is actuated to the second position $P_2$ so that fluid is communicated from the fluid outlet 32 of the fluid displacement assembly 20 to the third actuator 16*c* (shown in FIG. 4). As the third control valve 22*c* returns to the first position $P_1$, the fourth control valve 22*d* is actuated to the second position $P_2$ so that fluid is communicated from the fluid outlet 32 of the fluid displacement assembly 20 to the fluid inlet 30 (shown in FIG. 5). As the fourth control valve 22*d* returns to the first position $P_1$, the plurality of control valves 22 is again actuated until the requirements of the actuators 16 have been met. It will be understood, however, that the sequencing of the control valves 22 may change in subsequent actuations of the plurality of control valves 22 depending on the requirements of the actuators 16.

Figure 6:
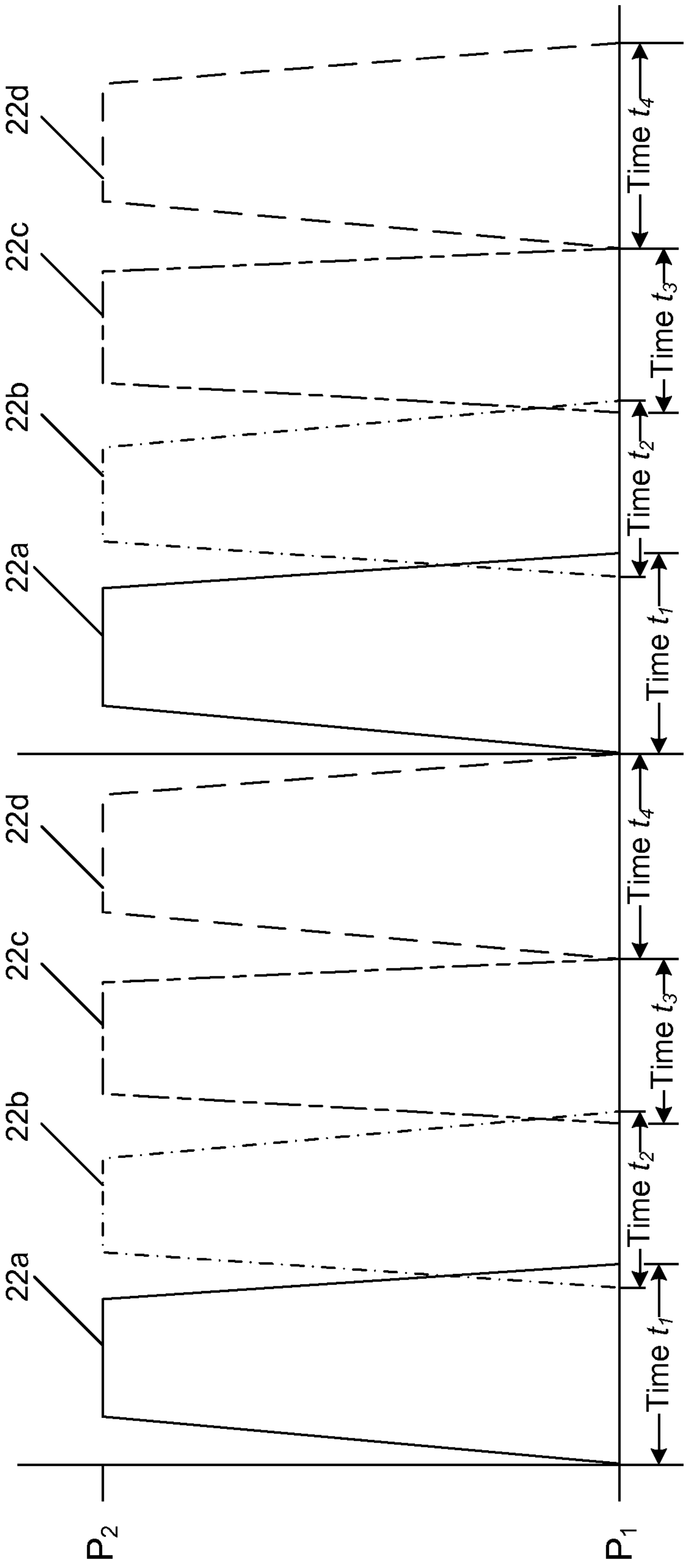
FIG. 6 is a representation of a method for actuating a control valve of a hydraulic system.

Referring now to FIG. 6, an exemplary actuation graph of the plurality of control valves 22 is shown. While the control valves 22 could be actuated in any order, the actuation graph depicted in FIG. 6 corresponds to the sequential actuation of the control valves 22 described above.

In the depicted example of FIG. 6, the actuation graph includes the actuation time $t_1$ of the first control valve 22*a*, the actuation time $t_2$ of the second control valve 22*b*, the actuation time $t_3$ of the third control valve 22*c* and the actuation time $t_4$ of the fourth control valve 22*d* for one cycle. In one aspect of the present disclosure, the order of magnitude for the actuation time t for each of the control valves 22 is milliseconds. While the actuation times t for the control valves 22 are shown in FIG. 6 to be generally equal in duration, it will be understood that the duration for each of the actuation times t can vary depending on the flow requirements of the corresponding actuator 16.

As a result of the repeated actuation of each of the control valves 22 during the operation of the hydraulic system 10, fluid pulses through the control valves 22 to the actuators 16. This pulsation of fluid through the control valves 22 can result in a noise, similar to a fluid hammer noise.

Figure 7:
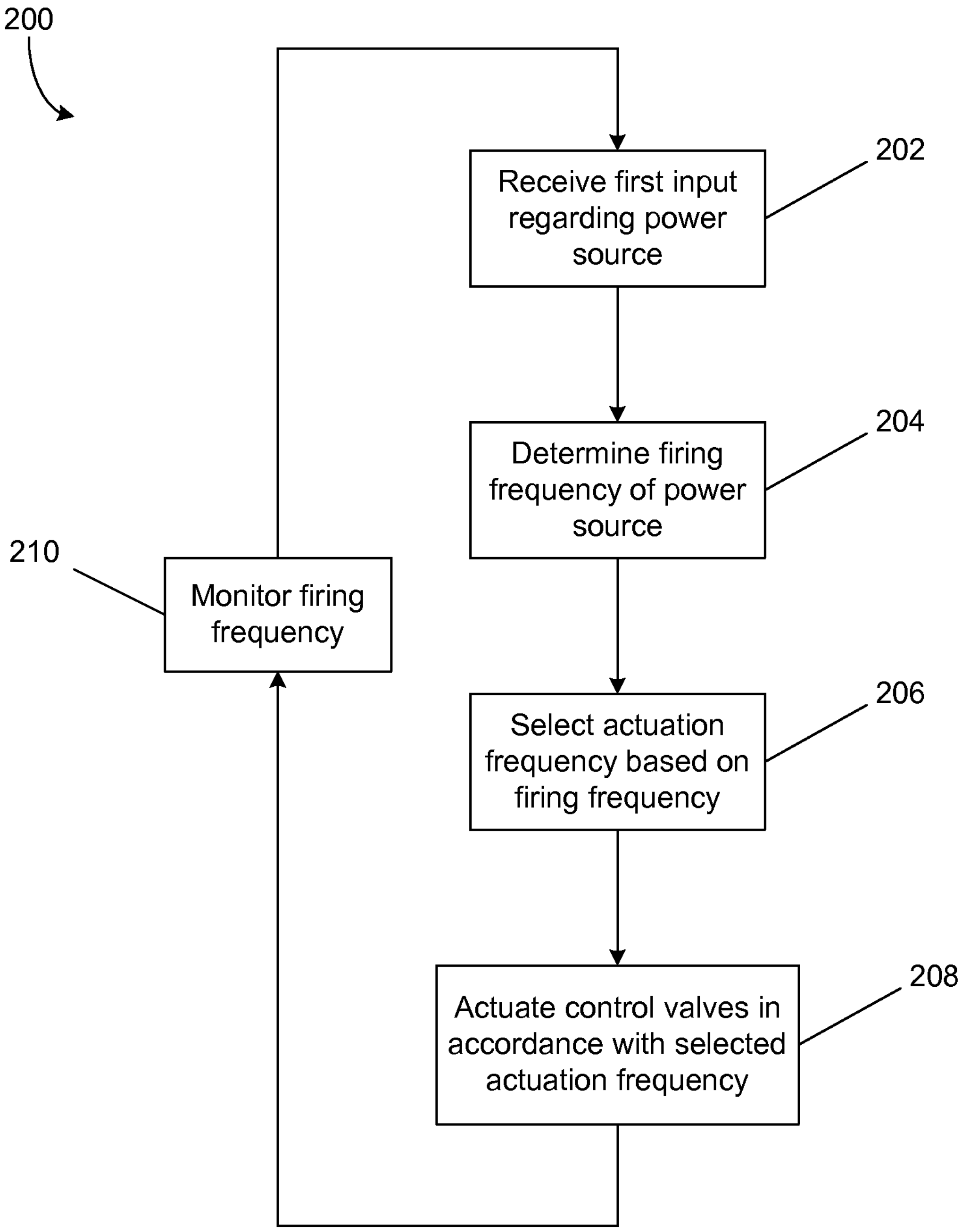
FIG. 7 is a representation of an alternate method for actuating a control valve of a hydraulic system.

Referring now to FIGS. 1 and 7, a method 200 for actuating the control valves 22 will be described. The vehicle 12 includes a variable speed component. The variable speed component has a variable frequency. This variable frequency can be any frequency of significant acoustic noise in the variable speed component.

The variable speed component could include auxiliary fluid pumps, auxiliary fluid motors, electric motors, and various implements that are coupled to the power source 28. Alternatively, the variable speed component could be the power source 28. For ease of description purposes only, the following methods for actuating the control valves 22 will be described with the power source 28 being the variable speed component. It will be understood, however, that the scope of the present disclosure is not limited to the variable speed component being the power source 28.

In one aspect of the present disclosure, the power source 28 is an engine that includes a plurality of pistons that reciprocate in a plurality of cylinders. As the pistons reciprocate in the cylinders, the pistons draw fuel into a combustion chamber of the cylinders and the fuel is compressed and ignited. The frequency at which the fuel is ignited in each cylinder is referred to hereinafter as the "firing frequency." In four-stroke engines, the fuel in each cylinder is ignited (or fired) once per every two revolutions of a crankshaft of the engine. Therefore, the firing frequency of the engine can be calculated by dividing the number of cylinders by two and multiplying that value by the rotation speed [revolutions per second] of the power source 28. In two-stroke engines, the fuel in each cylinder is ignited (or fired) once per revolution of the crankshaft of the engine. Therefore, the firing frequency of the two-stroke engine can be calculated by multiplying the number of cylinders by the rotation speed [revolutions per second] of the power source 28.

In step 202 of the method 200, the ECU 34 of the hydraulic system 10 receives a first input regarding the power source 28. In one aspect of the present disclosure, the first input regards the rotation speed of the power source 28. There are a variety of ways in which the ECU 34 of the hydraulic system 10 can receive the first input regarding the power source 28. For example, in the scenario where the first input regards the rotational speed of the power source 28, the ECU can receive the rotational speed directly from vehicle's CAN-bus, from a speed sensor mounted on the crankshaft of the power source 28, from a sensor disposed on the back of a gear box, which is coupled to the power source 28, etc.

In step 204, the ECU 34 determines the firing frequency of the power source 28. In one aspect of the present disclosure, the firing frequency is calculated by dividing the number of cylinders of the power source 28 by two and multiplying that value by the rotation speed of the power source 28.

In step 206, a control valve actuation frequency is selected for the plurality of control valves 22. The control valve actuation frequency is the frequency at which the control valves 22 are actuated. In one aspect of the present disclosure, the control valve actuation frequency is the frequency of the pulse width modulation signal for the control valves 22, which is equal to the reciprocal of the period of time required to actuate the plurality of control valves 22.

The control valve actuation frequency is selected such that it corresponds to the firing frequency of the power source 28. This correspondence between the control valve actuation frequency and the firing frequency of the power source 28 will be referred to as "frequency tracking." In aspect of the subject example, the control valve actuation frequency directly tracks the firing frequency of the power source 28. In other words, the control valve actuation frequency is about equal to the firing frequency of the power source 28.

By actuating the control valves 22 in accordance with the firing frequency of the power source 28, any noises associated with the actuation of the control valves 22 are masked by the noise of the power source 28. If the noises associated with the actuation of the control valves 22 are not entirely masked, the noises associated with the actuation of the control valves 22 would at least be similar to the noises of the power source 28. As a result, a user of the vehicle would not be alarmed or concerned about the noises associated with the actuation of the control valves 22 since those noises would have similar frequencies as the power source 28.

In step 208, each of the control valves 22 is actuated in accordance with the selected control valve actuation frequency. In one aspect of the present disclosure, the ECU 34 sends an electronic signal to each of the control valves 22 to actuate the control valve 22 between the first and second positions $P_1$, $P_2$.

In step 210, the firing frequency is monitored so that changes in the firing frequency result in changes in the control valve actuation frequency. In one aspect of the present disclosure, the firing frequency is continuously monitored. In another aspect of the present disclosure, the firing frequency is intermittently monitored.

Figure 8:
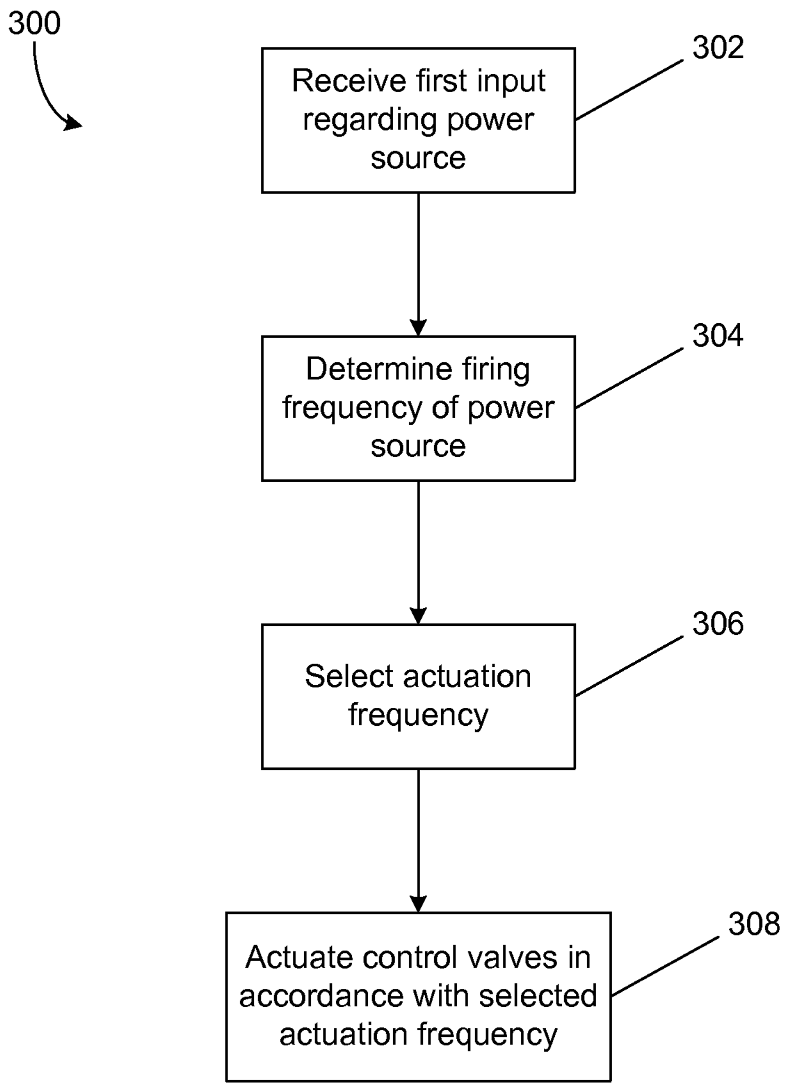
FIG. 8 is a representation of an alternate method for actuating a control valve of a hydraulic system.

Referring now to FIGS. 1 and 8, an alternate method 300 of masking the noise associated with actuation of the control valves 22 will be described. In step 302, the ECU 34 of the hydraulic system 10 receives the first input regarding the power source 28. In step 304, the ECU 34 computes the firing frequency of the power source 28 based on the first input.

In step 306, the control valve actuation frequency is selected. In one aspect of the present disclosure, the control valve actuation frequency and the firing frequency are harmonic frequencies. A harmonic frequency is an integer multiple of a fundamental frequency. In one aspect of the present disclosure, the fundamental frequency is the firing frequency of the power source 28 so that the control valve actuation frequency is a harmonic frequency of the firing frequency of the power source 28.

In another aspect of the present disclosure, the control valve actuation frequency and the firing frequency of the power source 28 are subharmonic frequencies. A subharmonic frequency is a frequency below the fundamental frequency in a ratio of n/m, where n and m are integers. In one aspect of the present disclosure, the fundamental frequency is the firing frequency so that the control valve actuation frequency is a subharmonic frequency of the firing frequency.

In step 308, each of the control valves 22 is actuated in accordance with the selected control valve actuation frequency.

Figure 9:
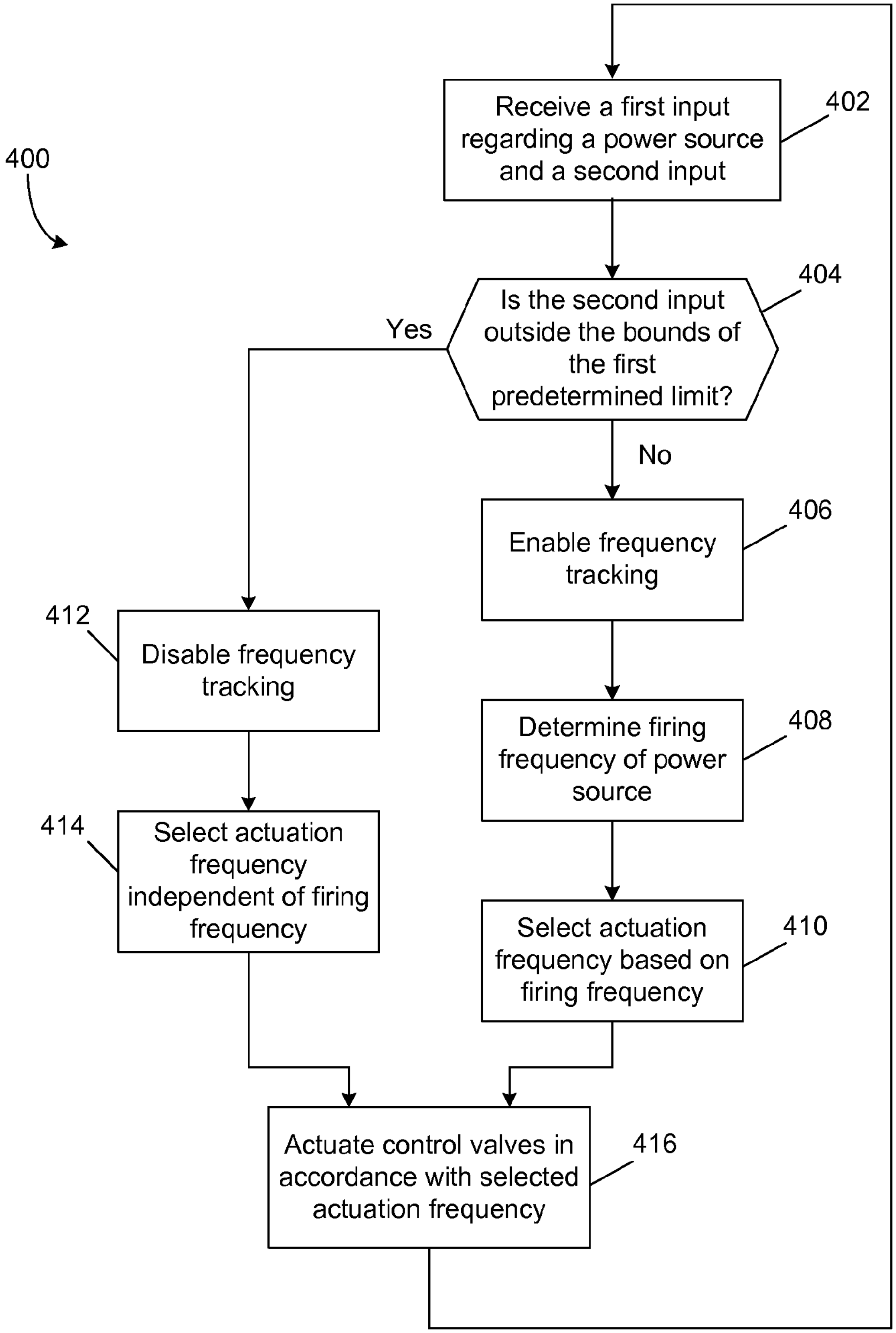
FIG. 9 is a representation of an alternate method for actuating a control valve of a hydraulic system.

Referring now to FIGS. 1 and 9, an alternate method 400 of masking the noise associated with actuation of the control valves 22 will be described. In step 402, the ECU 34 of the hydraulic system 10 receives the first input regarding the power source 28, as well as a second input (e.g., data, information, etc.) regarding at least one of the power source 28 and the hydraulic system 10. In one aspect of the present disclosure, the ECU 34 receives a second input regarding the horsepower output of the power source 28. In another aspect of the present disclosure, the ECU 34 receives a second input regarding the fluid pressure in the hydraulic system 10. In another aspect of the present disclosure, the ECU 34 receives a second input regarding the horsepower output of the power source 28 and the pressure of the hydraulic system 10.

In step 404, the ECU 34 compares the second input from at least one of the power source 28 and the hydraulic system 10 to a predetermined limit. In one aspect of the present disclosure, the predetermined limit is an upper limit. In another aspect of the present disclosure, the predetermined limit is a lower limit. In another aspect of the present disclosure, the predetermined limit is a range having a lower limit and an upper limit. The term "bounds of the predetermined limit" will be understood to mean a range from negative infinite to the upper limit when the predetermined limit is an upper limit, a range from the lower limit to infinite when the predetermined limit is a lower limit, and the upper and lower limits when the predetermined limit is a range having an upper limit and a lower limit. Frequency tracking is enabled in step 406 based on the relationship of the second input to the predetermined limit. For example, if the second input is within the bounds of the predetermined limit, frequency tracking is enabled in step 406. For example, if the horsepower output of the power source 28 is within the bounds of the predetermined limit (i.e., is less than or equal to an upper limit) or if the pressure of the hydraulic system 10 is within the bounds of the predetermined limit (i.e., is greater than or equal to a lower limit or within the range of the predetermined limit), the noise associated with the actuation of the control valves 22 may be discernable over the noise of the power source 28 without frequency tracking.

If frequency tracking is enabled, the ECU 34 computes the firing frequency of the power source 28 in step 408. In step 410, the control valve actuation frequency is selected based on the firing frequency of the power source 28.

If the second input is outside the bounds of the predetermined limit, frequency tracking is disabled in step 412. For example, if the horsepower output of the power source 28 is outside the bounds of the predetermined limit (i.e., is greater than an upper limit) or if the pressure of the hydraulic system 10 is outside the bounds of the predetermined limit (i.e., is less than a lower limit or is outside the range of the predetermined limit), the noise associated with the actuation of the control valves 22 would not likely be discernable over the noise of the power source 28. As a result, frequency tracking is not required to mask the noise associated with the actuation of the control valves.

Alternatively, if the second input is outside of the range of values of the predetermined limit, frequency tracking is disable in step 412. For example, if the second input (e.g., horsepower) is outside of an upper and lower limit, frequency tracking would be disabled.

With frequency tracking disabled, the control valve actuation frequency is selected independent of the firing frequency of the power source 28 in step 414. In step 416, each of the control valves 22 is actuated in accordance with the selected control valve actuation frequency.

Figure 10:
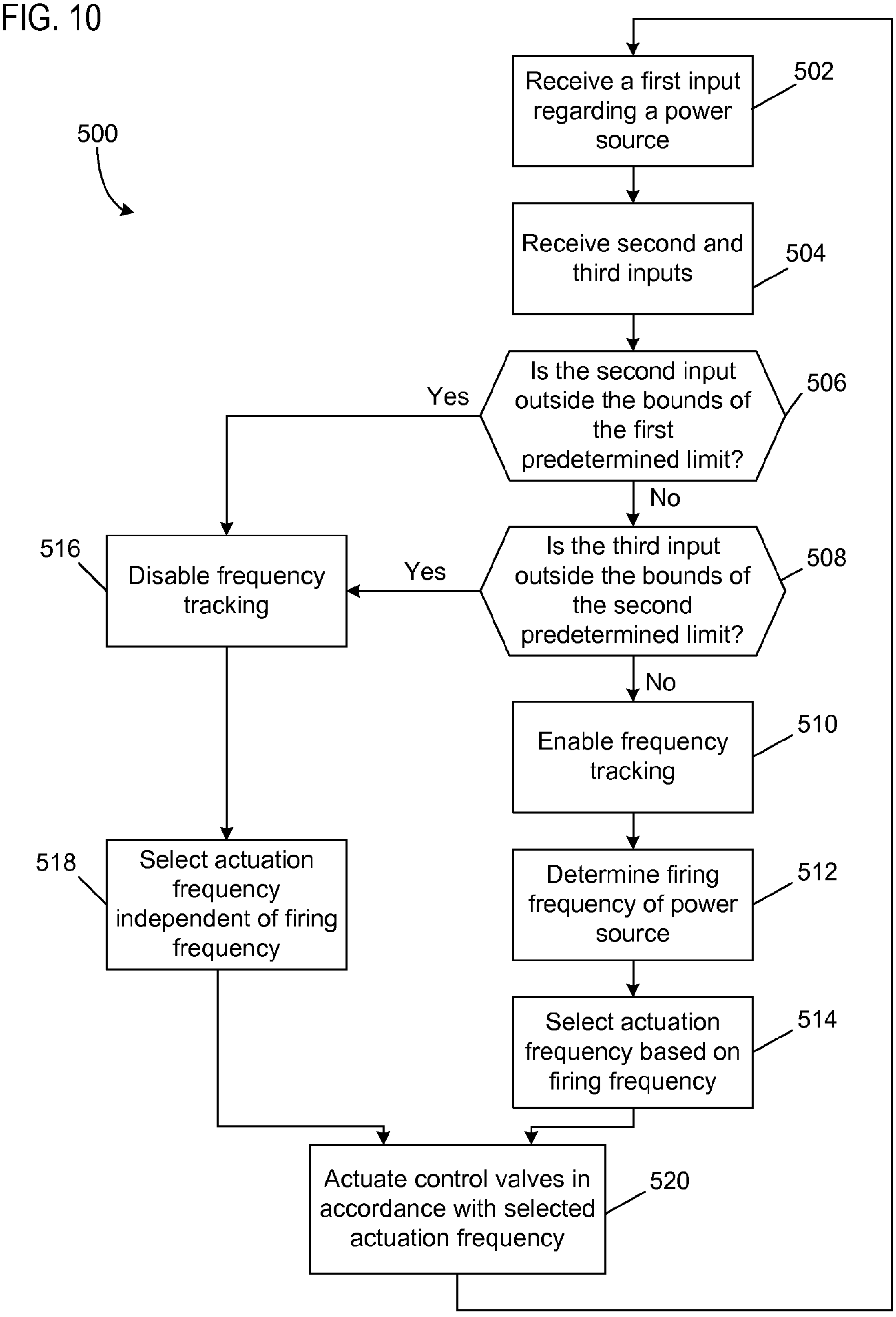
FIG. 10 is a representation of an alternate method for actuating a control valve of a hydraulic system.

Referring now to FIGS. 1 and 10, an alternate method 500 of masking the noise associated with actuation of the control valves 22 will be described. In step 502, the ECU 34 of the hydraulic system 10 receives the first input (e.g., rotational speed, etc.) regarding the power source 28. In step 504, the ECU 34 of the hydraulic system 10 receives a second input (e.g., data, information, etc.) regarding the hydraulic system 10 and a third input regarding the power source 28. In one aspect of the present disclosure, the second input is the pressure of the hydraulic system 10 while the third input is the horsepower output of the power source 28.

In step 506, the second input is compared to a first predetermined limit. If the second input is within the bounds of the first predetermined limit, the third input is compared to a second predetermined limit in step 508. If the third input is within the bounds of the second predetermined limit, frequency tracking is enabled in step 510. With frequency tracking enabled, the ECU 34 computes the firing frequency of the power source 28 in step 512. In step 514, the control valve actuation frequency is selected based on the firing frequency of the power source.

If the second input is outside the bounds of the first predetermined limit or if the third input is outside the bounds of the second predetermined limit, the noise associated with the actuation of the control valves 22 would not likely be discernable over the noise of the power source 28. As a result, frequency tracking is not required to mask the noise associated with the actuation of the control valves 22. Therefore, in step 516, frequency tracking is disabled. With frequency tracking disabled, the control valve actuation frequency is selected independent of the firing frequency of the power source 28 in step 518.

In step 520, each of the control valves 22 is actuated in accordance with the selected control valve actuation frequency.

Figure 11:
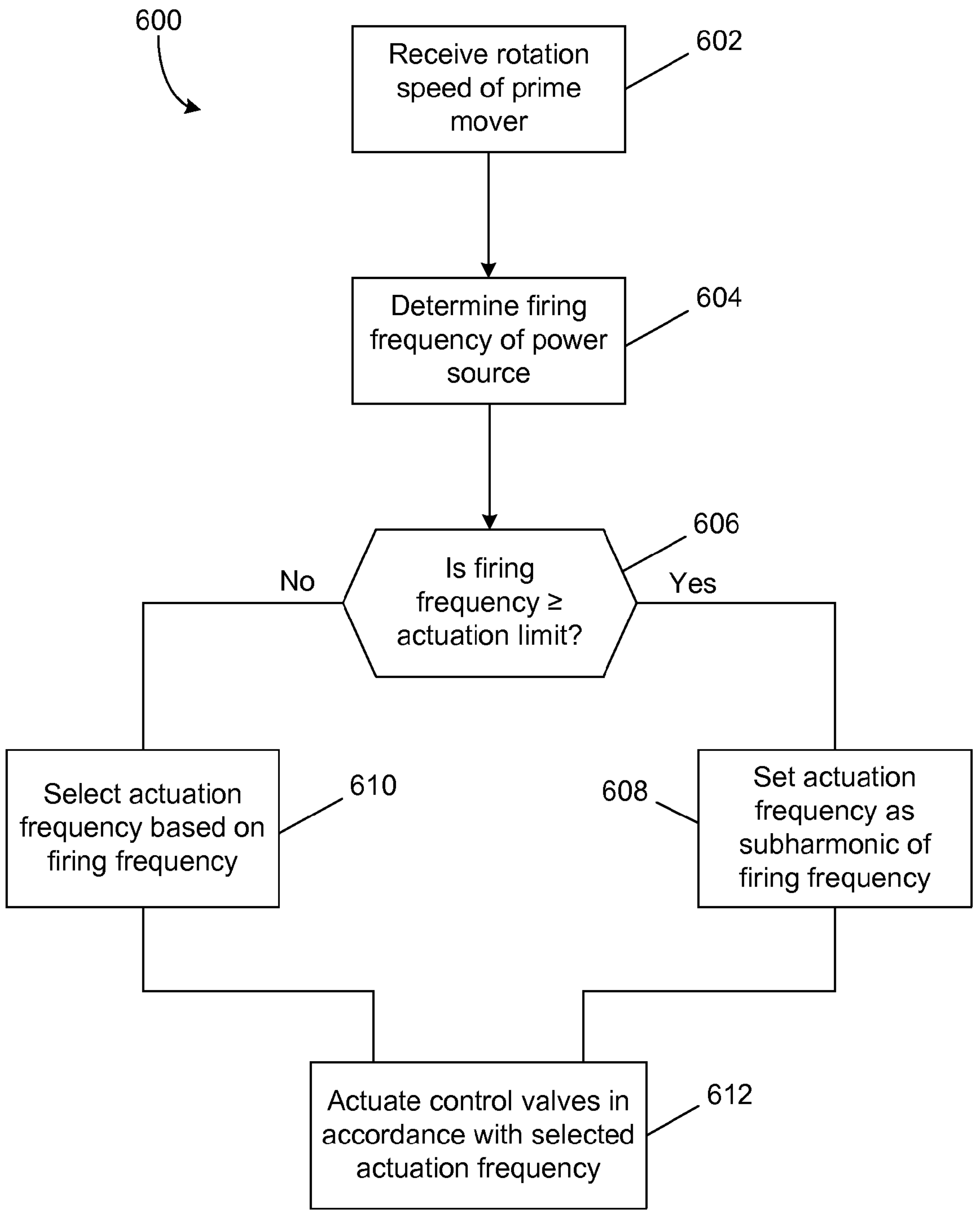
FIG. 11 is a representation of an alternate method for actuating a control valve of a hydraulic system.

Referring now to FIGS. 1 and 11, an alternate method 600 of masking the noise associated with actuation of the control valves 22 will be described. In step 602, the ECU 34 of the hydraulic system 10 receives the rotation speed of the power source 28. In step 604, the ECU 34 computes the firing frequency of the power source 28.

In step 606, the firing frequency is compared to an actuation limit value. The actuation limit value is a maximum frequency for the control valves 22. This maximum frequency may relate to the maximum switching speed of the control valves (i.e., the speed at which the control valves can be switched between the first and second positions $P_1$, $P_2$), the switching speed of the control valves necessary to obtain a desired life value, system efficiency, etc.

If the firing frequency is greater than the actuation limit value, the control valve actuation frequency is selected in step 608 so that the control valve actuation frequency is a subharmonic frequency of the firing frequency. If the firing frequency is less than the actuation limit value, the control valve actuation frequency is selected in step 610 so that the control valve actuation frequency is based on (e.g., about equal to, harmonic, etc.) the firing frequency. In step 612, the control valves 22 are actuated in accordance with the selected control valve actuation frequency.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for actuating a control valve of a hydraulic system, the method comprising:

receiving an input from a variable speed component;

determining a frequency of the variable speed component based on the input;

selecting a frequency of a pulse width modulation signal for a control valve of a hydraulic system, wherein the selected frequency of the pulse width modulation signal is based on the frequency of the variable speed component; and actuating the control valve in accordance with the selected frequency of the pulse width modulation signal;

wherein the control valve is a two-position type control valve; and wherein the frequency of the pulse width modulation signal of the control valve is selected so that the frequency of the pulse width modulation signal of the control valve is based on the frequency of the variable speed component if the frequency of the variable speed component is greater than an actuation limit.

2. The method of claim 1, wherein the hydraulic system includes an actuator that is in selective fluid communication with the control valve.

3. The method of claim 1, wherein the variable speed component is a power source.

4. The method of claim 1, wherein the frequency of the pulse width modulation signal is a harmonic frequency of the frequency of the variable speed component.

5. The method of claim 1, wherein the frequency of the pulse width modulation signal is a subharmonic frequency of the frequency of the variable speed component.

6. The method of claim 1, wherein the frequency of the pulse width modulation signal is about equal to the frequency of the variable speed component.

7. The method of claim 1, wherein the input is a rotational speed of one of an engine, a fluid pump, a fluid motor, an electric motor, and an implement.

8. A method for actuating a control valve of a hydraulic system, the method comprising:
- receiving an input from a variable speed component;
- determining a frequency of the variable speed component based on the input;
- selecting a frequency of a pulse width modulation signal for a control valve of a hydraulic system, wherein the selected frequency of the pulse width modulation signal is based on the frequency of the variable speed component; and
- actuating the control valve in accordance with the selected frequency of the pulse width modulation signal;
- wherein the frequency of the pulse width modulation signal of the control valve is selected so that the frequency of the pulse width modulation signal of the control valve is a subharmonic frequency of the frequency of the variable speed component if the frequency of the variable speed component is greater than an actuation limit.

9. A method for actuating a control valve of a hydraulic system, the method comprising:
- receiving a first input from a variable speed component;
- receiving a second input from the variable speed component;
- comparing the second input to a predetermined limit;
- enabling frequency tracking if the second input is within the bounds of the predetermined limit, wherein frequency tracking includes:
  - determining a frequency of the variable speed component based on the first input;
  - selecting a control valve actuation frequency for a control valve of a hydraulic system, wherein the control valve actuation frequency is based on the frequency of the variable speed component;
- actuating the control valve in accordance with the control valve actuation frequency.

10. The method of claim 9, wherein the first input is rotational speed of the variable speed component.

11. The method of claim 9, wherein the predetermined limit is an upper limit.

12. The method of claim 9, wherein the control valve actuation frequency is a harmonic frequency of the frequency of the variable speed component.

13. The method of claim 9, wherein the control valve actuation frequency is a subharmonic frequency of the frequency of the variable speed component.

14. The method of claim 9, wherein the variable speed component is selected from the group consisting of an engine, a fluid pump, a fluid motor, an electric motor, and an implement.

15. The method of claim 9, further comprising:
- receiving a third input from a hydraulic system;
- comparing the third input to a second predetermined limit;
- wherein frequency tracking is enabled if the second input is within the bounds of the predetermined limit and if the third input is within the bounds of the second predetermined limit.

16. A hydraulic system comprising:
- a power source;
- a fluid displacement assembly coupled to the power source;
- a plurality of actuators in selective fluid communication with the fluid displacement assembly;
- a plurality of control valves adapted to provide selective fluid communication between the fluid displacement assembly and the plurality of actuators; and
- an electronic control unit adapted to actuate the plurality of control valves, wherein the electronic control unit:
  - receives a rotational speed of the power source as a first input;
  - receives a second input from the power source;
  - determines a firing frequency of the power source based on the rotational speed;
  - selects a frequency of a pulse width modulation signal for the plurality of control valves based on the firing frequency of the power source;
  - actuates the plurality of control valves in accordance with the frequency of the pulse width modulation signal if the second input is within bounds of a predetermined limit; and
  - actuates the plurality of control valves in a sequence.

17. The hydraulic system of claim 16, wherein each of the plurality of control valves is a two-way, two position digital valve.

18. The hydraulic system of claim 16, wherein the power source is an engine.

19. The hydraulic system of claim 16, wherein the rotational speed of the power source is received through a CAN-bus.

20. The hydraulic system of claim 16, wherein the firing frequency and the frequency of the pulse width modulation signal are harmonic frequencies.

21. The hydraulic system of claim 16, wherein the sequence is a predetermined sequence.

22. The hydraulic system of claim 16, wherein only one of the plurality of control valves is sent an opening signal at a time.

* * * * *